(12) United States Patent
Wilcox (10) Patent No.: US 7,049,906 B2
(45) Date of Patent: May 23, 2006

(54) QUAD BAND ANTENNA INTERFACE MODULES INCLUDING MATCHING NETWORK PORTS

(75) Inventor: Bruce Emerson Wilcox, Cary, NC (US)

(73) Assignee: Sony Ericsson Mobile Communications AB (SE)

( * ) Notice: Subject to any disclaimer, the term of this patent is extended or adjusted under 35 U.S.C. 154(b) by 264 days.

(21) Appl. No.: 10/447,777

(22) Filed: May 29, 2003

(65) Prior Publication Data

US 2004/0239442 A1    Dec. 2, 2004

(51) Int. Cl.
*H01P 5/12* (2006.01)
(52) U.S. Cl. .................. 333/126; 333/101; 333/124
(58) Field of Classification Search ............... 333/126, 333/101, 132, 262, 17.3, 124, 125, 32, 33, 333/263, 81 R, 81 A
See application file for complete search history.

(56) References Cited

U.S. PATENT DOCUMENTS

| | | | |
|---|---|---|---|
| 5,519,364 A * | 5/1996 | Kato et al. ................... 333/103 |
| 5,748,054 A * | 5/1998 | Tonegawa et al. ........... 333/104 |
| 5,912,599 A * | 6/1999 | Beall .......................... 333/81 R |
| 6,141,561 A * | 10/2000 | Izumiyama ............... 455/553.1 |
| 6,229,412 B1 | 5/2001 | Delzer |
| 6,380,823 B1 * | 4/2002 | Ikata et al. ................... 333/133 |
| 6,400,963 B1 * | 6/2002 | Glockler et al. .......... 455/553.1 |
| 6,445,262 B1 * | 9/2002 | Tanaka et al. ............... 333/133 |
| 6,522,895 B1 | 2/2003 | Montalvo |
| 6,606,015 B1 * | 8/2003 | Uriu et al. ................... 333/132 |
| 6,650,199 B1 * | 11/2003 | Dobrovolny ................. 333/103 |
| 6,745,046 B1 * | 6/2004 | Eckert et al. ............. 455/552.1 |
| 6,816,714 B1 * | 11/2004 | Toncich ....................... 455/107 |
| 6,845,231 B1 * | 1/2005 | Frank ............................ 455/88 |
| 2002/0053947 A1 | 5/2002 | Macedo |
| 2002/0090974 A1 | 7/2002 | Hagn |
| 2004/0203552 A1 * | 10/2004 | Horiuchi et al. ............. 455/333 |

FOREIGN PATENT DOCUMENTS

EP    1 168 650 A1    1/2002
JP    2003209484 A *  7/2003

OTHER PUBLICATIONS muRata, Specification Goal No. SP-LMZ-88, entitled *Switchplexer™ for QuadBand, Tentative Part No. LMSP-0032TEMP* (2002).
Panasonic, Preliminary Specification, *GN040xxN: SP6T GaAs Antenna Switch Module*, Jan. 9, 2002.

(Continued)

Primary Examiner—Robert Pascal
Assistant Examiner—Kimberly E. Glenn
(74) Attorney, Agent, or Firm—Myers Bigel Sibley & Sajovec (57) ABSTRACT

Quad band antenna interface modules include a diplexer that is configured to connect to an antenna port, a switching core that is connected to the diplexer, and filters that are connected to the switching core and are configured to provide transmit and receive ports for four frequency bands. At least one matching network port is connected between the switching core and at least one of the filters and is configured to connect a matching network thereto. Three filters and three matching network ports may be provided. A switched impedance matching network and/or a singly compensated dual diode switch also may be provided.

29 Claims, 6 Drawing Sheets

OTHER PUBLICATIONS

Invitation to Pay Additional Fees, PCT/IB2004/000131, Jul. 13, 2004.

Jentschel et al., *Multimodale Funktelefone*, Nachrichtentechnik Elektronik, Veb Verlag Technik. Berlin, De, vol. 46, No. 3, May 1, 1996, pp. 33-39.

Notification of Transmittal of the International Search Report and The Written Opinion of the International Searching Authority, orthe Declaration, International Search Report, and Written Opinion of the International Searching Authority.

* cited by examiner

QUAD BAND ANTENNA INTERFACE MODULES INCLUDING MATCHING NETWORK PORTS

FIELD OF THE INVENTION

This invention relates to Radio Frequency (RF) transmitting and receiving devices, and more particularly to antenna interface modules for wireless devices.

BACKGROUND OF THE INVENTION

Wireless terminals are widely used for voice and/or data communications. As used herein, the term "wireless terminal" encompasses a wide variety of portable or fixed wireless devices that can access a wireless communications system. Wireless terminals include a cellular radiotelephone with a multi-line display, a Personal Communications System (PCS) terminal that may combine a cellular radiotelephone with data processing, facsimile and/or data communications capabilities, a Personal Digital Assistant (PDA) that can include a radiotelephone, pager, Internet/intranet access, Web browser, organizer, calendar and/or a Global Positioning System (GPS) receiver, and conventional laptop, palmtop and/or pervasive computing devices that include wireless receivers.

It is often desirable for a wireless terminal to transmit and receive over multiple frequency bands, for example to provide both PCS and GSM capabilities. It also may be desirable to provide wireless terminals that operate over four RF bands. For example, it may be desirable to provide a wireless terminal that can operate over the GSM850 band that is used in the United States (also referred to herein simply as GSM), the EGSM900 band that is used in Europe (also referred to herein simply as EGSM), the DCS1800 band that is used in Europe (also referred to herein simply as DCS) and the PCS1900 band that is used in the United States (also referred to herein simply as PCS). The transmit (TX) and receive (RX) frequencies of these bands are shown in Table 1:

TABLE 1

| Frequency Range | Band |
| --- | --- |
| 824 Mhz–849 Mhz | GSM850 TX Band: US |
| 869 Mhz–894 Mhz | GSM850 RX Band: US |
| 880 Mhz–915 Mhz | EGSM900 TX Band: Europe |
| 925 Mhz–960 Mhz | EGSM900 RX Band: Europe |
| 1710 Mhz–1785 Mhz | DCS1800 TX Band: Europe |
| 1805 Mhz–1880 Mhz | DCS1800 RX Band: Europe |
| 1850 Mhz–1910 Mhz | PCS1900 TX Band: US |
| 1930 Mhz–1990 Mhz | PCS1900 RX Band: US |

A quad band antenna interface module may be used to interface between an antenna port and the transmit and receive ports for the four bands. Unfortunately, it may be difficult to design a quad band antenna interface module that can provide satisfactory RF performance at low cost. In particular, it may be difficult to obtain a satisfactory Voltage Standing Wave Ratio (VSWR) and/or to obtain satisfactory port-to-port isolation in a quad band antenna interface module.

As is well known to those having skill in the art, VSWR is a figure of merit that may be used to quantify the port mismatch loss between an energy source and a load. The relationship between VSWR and source-to-load mismatch loss is generally defined by the following equation:

$$\text{Mismatch\_Loss} = 10 * \text{Log}\left(1 - \left[\frac{VSWR-1}{VSWR+1}\right]^2\right) \quad (1)$$

A 2:1 VSWR therefore translates into a 0.5 dB loss. A 3:1 VSWR translates into a 1.25 dB loss. A 4:1 VSWR translates into a 1.93 dB loss. This extra insertion loss may directly impact the overall RF performance of the wireless terminal. Since the remainder of the wireless terminal performance may be fixed, it may be desirable to reduce or minimize the port mismatch loss so as to achieve satisfactory wireless terminal performance.

Moreover, wireless terminals may increasingly use internal antenna structures. Compared to external antenna structures, internal antennas may present a much larger VSWR range to the RF circuitry. The use of internal antennas may make it even more difficult to reduce or minimize mismatch loss over the four bands.

As noted above, it may also be difficult to obtain a desirable transmit port-to-receive port isolation. In particular, it is known that transmit energy feedback into the wireless terminal circuitry may cause voltage controlled oscillator frequency pulling, which may cause transmit mode frequency error. Unfortunately, however, it may be difficult to obtain sufficient TX-to-RX isolation in the above-described quad band frequencies as a result of frequency band overlaps.

Figure 1:
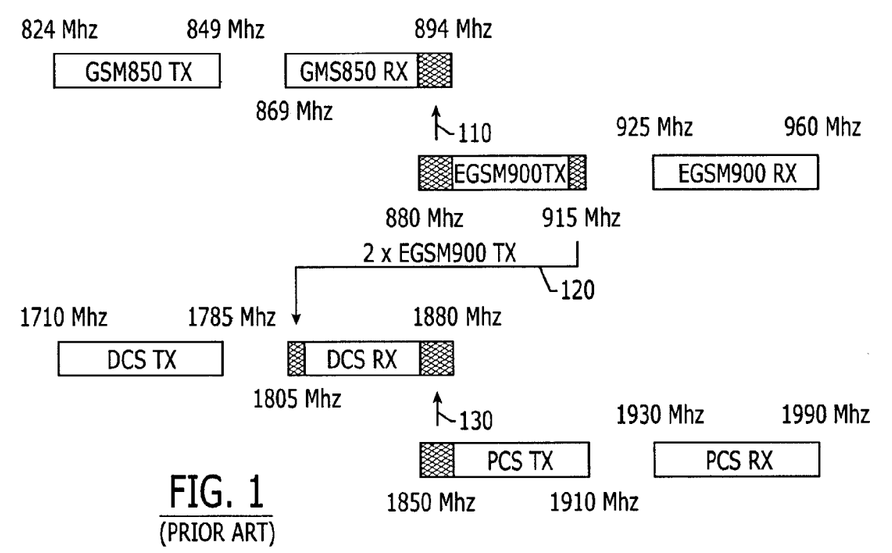
FIG. 1 is a frequency spectrum illustrating four common wireless communications transmit and receive frequency bands.

In particular, FIG. 1 graphically illustrates frequency overlaps in the quad band frequencies of Table 1. Arrows 110, 120 and 130 represent frequency band overlap regions between the EGSM transmit frequency band and the GSM receive frequency band, between twice the EGSM transmit frequency band and the DCS1800 receive band, and between the PCS transmit band and the DCS receive band, respectively. These overlap regions may define the worst case attenuation needs. The overlap region represented by arrow 130 may represent the toughest isolation requirement. It may be desirable to provide about 35 dB or more of PCS TX to DCS RX isolation to reduce or minimize transmitter modulation errors.

Figure 2:
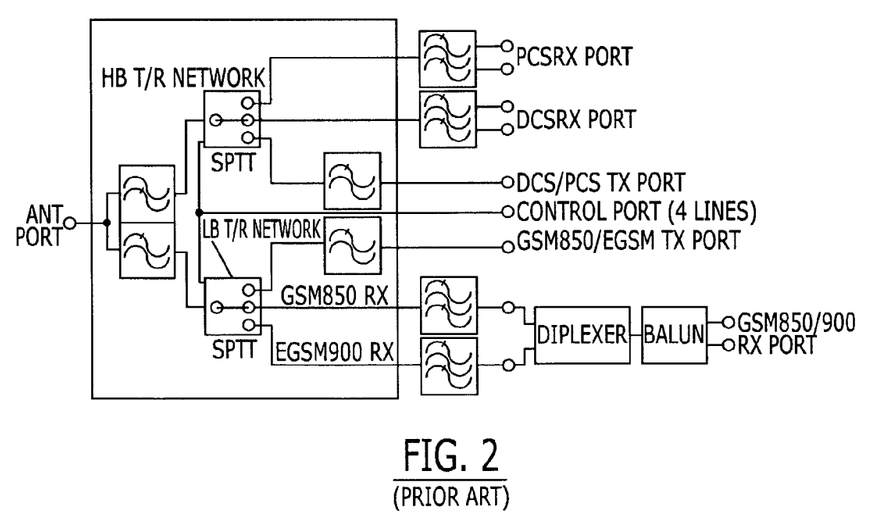
FIGS. 2 and 3 are block diagrams of conventional quad band antenna interface modules.

Quad band antenna interface modules have been proposed. For example, a quad band interface module marketed by muRata under the designation LMSP-0032TEMP is illustrated in FIG. 2 and is described, for example, in the Specification Goal No. SP-LMZ-88, entitled Switchplexer™ for QuadBand, Tentative Part Number LMSP-0032TEMP (2002). Integrated receive Surface Acoustic Wave (SAW) filters may be available for this module in 2003.

Figure 3:
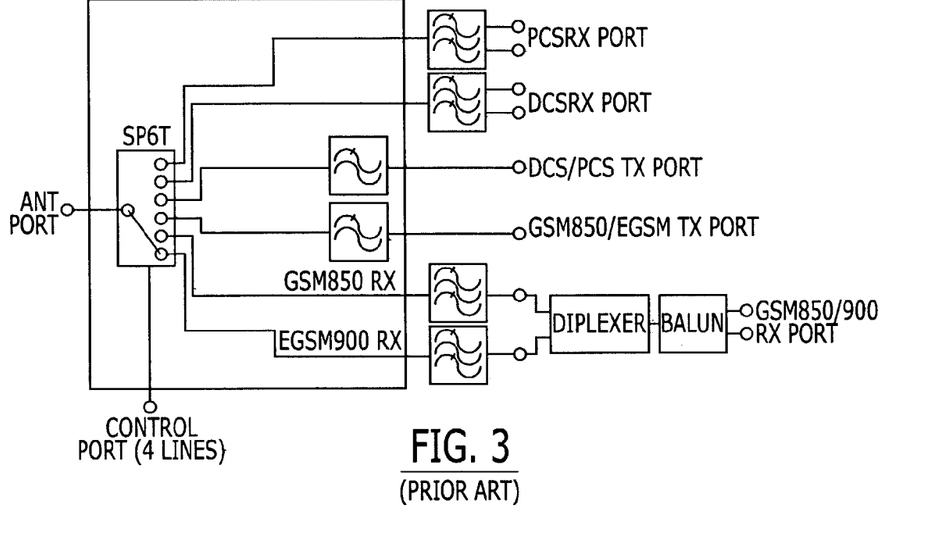

A quad band antenna interface marketed by Panasonic under the designation GNO40xxN is illustrated in FIG. 3, and is described in the Preliminary Specification entitled GN040xxN: SP6T GaAs Antenna Switch Module, 9 Jan. 2002. A quad band interface module marketed by Sony under the designation CXGSP6TM has a similar architecture. Both of these modules may integrate RX SAW filters in 2003.

Unfortunately, the above-described quad band antenna interface modules may not provide sufficient impedance matching between the switching core thereof and the receiver SAW filters, which may result in lower worst case receiver sensitivity and/or degraded audio. Moreover, the DCS/PCS_TX port to DCS_RX port isolation may be insufficient, which may translate into TX mode peak phase error and/or TX link modulation distortion. The EGSM_TX port to DCS_RX port isolation at twice the transmit frequency also may be insufficient, which may translate into TX mode peak phase error and/or TX link modulation distortion. Finally, the EGSM_TX port to GSM850_RX port isolation at twice the transmit frequency may be insufficient and may translate into TX mode peak phase error and/or TX link modulation distortion.

SUMMARY OF THE INVENTION

Quad band antenna interface modules according to some embodiments of the present invention include a diplexer that is configured to connect to an antenna port, a switching core that is connected to the diplexer, and a plurality of filters that are connected to the switching core and are configured to provide transmit and receive ports for four frequency bands. At least one matching network port is connected between the switching core and at least one of the plurality of filters and is configured to connect a matching network thereto. In some embodiments, the plurality of filters comprises three filters, and the at least one matching network port comprises three matching network ports, a respective one of which is connected between the switching core and a respective one of the three filters and configured to connect a matching network thereto. In some embodiments, the plurality of filters comprises a plurality of transmit filters and a plurality of receive filters, and the at least one matching network port is connected between the switching core and at least one of the plurality of receive filters. In some embodiments, a matching network port is not included between the switching core and the plurality of transmit filters.

In other embodiments of the present invention, the quad bands comprise a first frequency band, such as the GSM850 frequency band, a second frequency band such as the EGSM900 frequency band that at least partially overlaps the first frequency band, a third frequency band such as the DCS1800 frequency band, and a fourth frequency band such as the PCS1900 frequency band that at least partially overlaps the third frequency band. The first and second frequency bands are non-overlapping with the third and fourth frequency bands. The diplexer comprises a first diplexer filter for the third and fourth frequency bands, and a second diplexer filter for the first and second frequency bands. The switching core comprises a first transmit/receive switch connected to the first diplexer filter, and a second transmit/receive switch connected to the second diplexer filter. The plurality of filters comprises first through fourth receive filters for the respective first through fourth frequency bands, the first and second receive filters being connected to the second transmit/receive switch, and the third and fourth receive filters being connected to the first transmit/receive switch.

In some embodiments, the at least one matching network port comprises a matching network port connected between the second transmit/receive switch and the first receive filter. In other embodiments, the at least one matching network port comprises a matching network port connected between the second transmit/receive switch and the second receive filter. In still other embodiments, the at least one matching network port comprises a matching network port connected between the first transmit/receive switch and the third and fourth receive filters. In still other embodiments, the at least one matching network port comprises a matching network port connected between the first transmit/receive switch and the third receive filter. In yet other embodiments, the at least one matching network port comprises a matching network port connected between the first transmit/receive switch and the fourth receive filter. Combinations and subcombinations of these matching network port configurations also may be provided according to some embodiments of the present invention.

Other embodiments of the present invention provide a switched impedance matching network between the antenna and the antenna port. The switched impedance matching network includes a PI matching network connected to the antenna port. The PI matching network includes second and third impedance elements and a first impedance element therebetween. A bypass switch network is configured to couple the second and third impedance elements to a fixed potential such as ground in a matching mode, and to shunt across the first impedance element and uncouple the second and third impedance elements from ground in a bypass mode. In other embodiments, the bypass switch network comprises a second switch that is connected between the second impedance element and the fixed potential such as ground, a third switch that is connected between the third impedance element and ground, and a first switch that is connected across the first impedance element. It also will be understood that switched matching networks according to these embodiments of the invention may be used in other RF applications to couple an RF input to an RF output while allowing true bypass switched matching.

In still other embodiments of the invention, the switching core comprises a plurality of diode switches. At least one of the diode switches comprises a singly compensated dual diode network. In some embodiments, the singly compensated dual diode network comprises a pair of diodes electrically connected in parallel to the signal path and a compensating capacitor connected between the pair of diodes and a fixed potential such as ground. In other embodiments, a resistor is connected across the compensating capacitor. It will also be understood that singly compensated dual diode networks may be used in other RF applications as a switch between an RF input and an RF output. Finally, it will be understood that any of the embodiments of the invention that are described herein may be combined with a plurality of wireless terminal components to provide a wireless terminal.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 4:
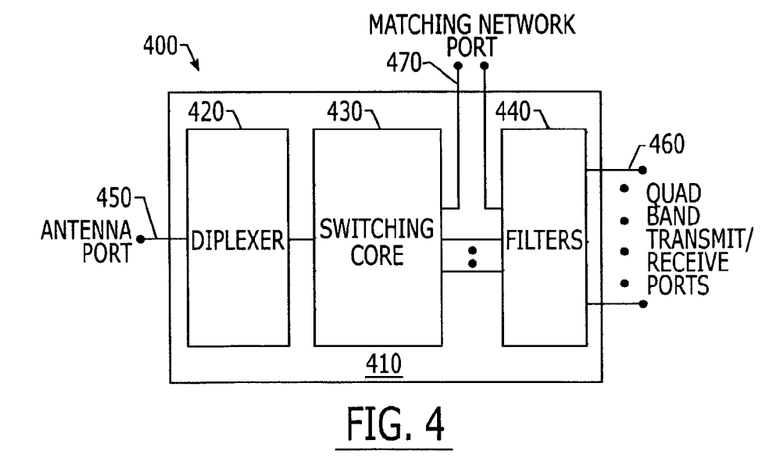
FIGS. 4–7 are block diagrams of quad band antenna interface modules including matching network ports according to various embodiments of the present invention.

FIG. 4 is a block diagram of quad band antenna interface modules according to some embodiments of the present invention. As shown in FIG. 4, these quad band antenna interface modules 400 include a diplexer 420 (which may also be referred to as a splitter or multiplexer) that is configured to connect to an antenna port 450. A switching core 430 is connected to the diplexer. A plurality of filters 440 are, connected to the switching core 430 and are configured to provide transmit and receive ports 460 for four frequency bands ("quad band"). At least one matching network port 470 is connected between the switching core 430 and at least one of the plurality of filters 440. The matching network port 470 is configured to connect a matching network thereto. In some embodiments, the diplexer 420, the switching core 430 and the filters 440 are located on a single substrate 410 and the antenna port 450, the quad band transmit/receive ports 460 and the matching network port 470 are configured to provide external input/output connections to the substrate.

As shown in FIG. 4, according to some embodiments of the present invention, at least one matching network port 470 is provided between the switching core 430 and at least one of the filters 440. In some embodiments, the filters 440 comprise a plurality of transmit filters and a plurality of receive filters, and the at least one matching port 470 is between the switching core 430 and at least one of the plurality of receive filters. In other embodiments, a matching network port is not provided between the switching core and any of the transmit filters. Accordingly, matching networks according to some embodiments of the present invention need not affect the transmit path tuning.

Moreover, the filters 440 may be embodied as SAW devices, which can be the highest Q (narrowest bandwidth) devices in the antenna-matching module 400. The SAW filter insertion loss and ripple performance may degrade when the device is not terminated properly. Often, the wireless terminal design may be based on a 50Ω system impedance. Therefore, an interface that is connected to the wireless terminal should match this requirement. Unfortunately, the internal antenna technology may not provide the standard 50Ω system impedance across eight frequency bands of operation. However, matching network ports according to some embodiments of the present invention can properly match the SAW filters. If matching is not needed, a 50Ω jumper (shunt) may be installed across selected matching network ports.

Figure 5:
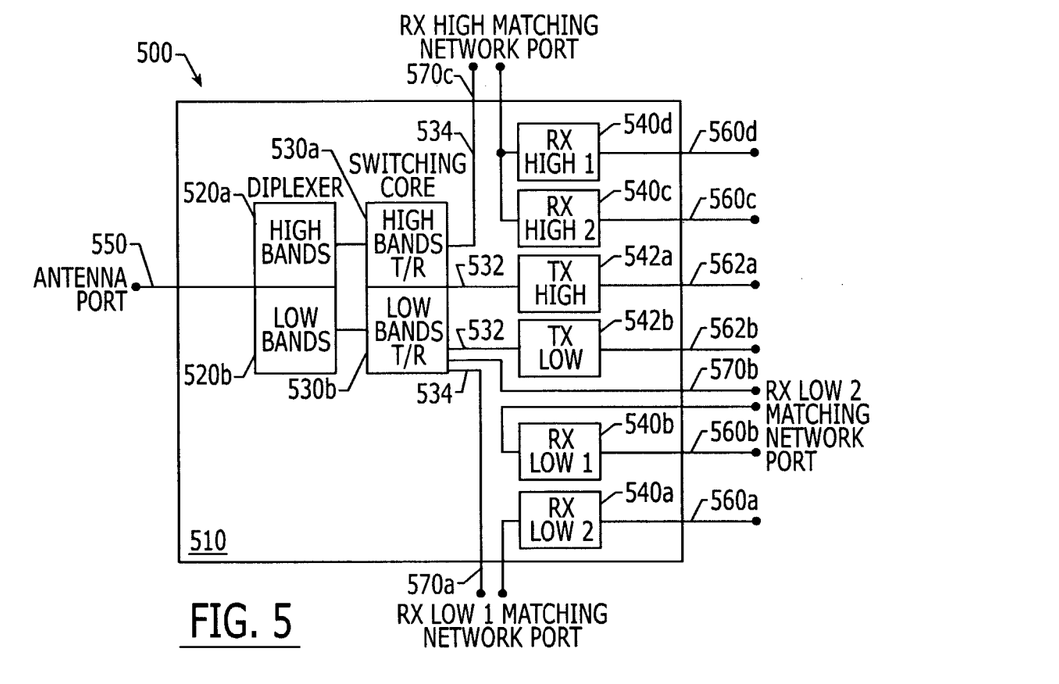

FIG. 5 illustrates other embodiments of the present invention, wherein three separate matching network ports are provided. In these embodiments, the quad bands comprise a first frequency band, a second frequency band that partially overlaps the first frequency band, a third frequency band and a fourth frequency band that partially overlaps the third frequency band. The first and second frequency bands are non-overlapping with the third and fourth frequency bands. The first and second partially overlapping frequency bands may be referred to herein collectively as the "low bands", and the third and fourth partially overlapping frequency bands may be referred to herein as "high bands".

As shown in FIG. 5, the diplexer comprises a first diplexer filter 520a for the high bands and a second diplexer filter 520b for the low bands. Moreover, the switching core comprises a first transmit/receive (T/R) switch 530a connected to the first diplexer filter 520a and a second T/R switch 530b connected to the second diplexer filter 520b. Finally, the plurality of filters comprise first through fourth receiver filters 540a–540d for the respective first through fourth frequency bands, the first and second receive filters 540a and 540b being connected to the second transmit/receive switch 530b and the third and fourth receive filters 540c, 540d being connected to the first transmit/receive switch 530a.

Still continuing with the description of FIG. 5, one, two or three matching network ports 570a–570c may be provided. A first matching network port 570a, also referred to herein as an RX LOW1 matching network port, is connected between the second transmit/receive switch 530b and the first receive filter 540a. The second matching network port 570b, also referred to herein as an RX LOW2 matching network port, is connected between the second transmit/receive switch 530b and the second receive filter 540b. The third matching network port 570c, also referred as an RX HIGH matching network port, is connected between the first transmit/receive switch 530a and the third and fourth receive filters 540c and 540d. As stated above, combinations of the RX LOW1 matching network port 570a, RX LOW2 matching network port 570b and RX HIGH matching network port 570c may be provided in other embodiments of the present invention. Finally, as shown, the diplexer, switching core and filters all may be included on a single substrate 510.

Embodiments of FIG. 5 may also be viewed as including a transmit/receive switching core 530a, 530b that is connected to an antenna port 555, to provide separate transmit 532 and receive 534 paths. At least one receive filter 540a–540d is connected to the receive path 534, and is configured to provide at least one receive port 560a–560d for at least one frequency band. At least one matching network port 570a–570c is connected between the receive path 534 of the switching core and at least one of the receive filters 540a–540d, and is configured to connect a matching network thereto. Finally, at least one transmit filter 542a, 542b is connected to the transmit path 532 of the switching core, and is configured to provide at least one transmit port 562a, 562b for the at least one frequency band. The antenna interface module 500 is free of a matching network port between the transmit path 532 and the transmit filters 542a–54b.

Figure 6:
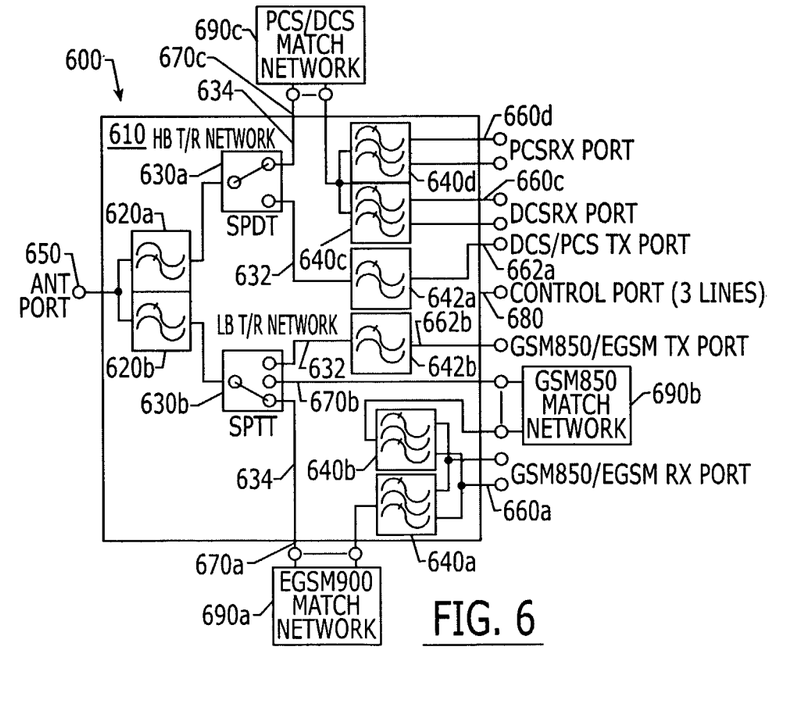
Figure 7:
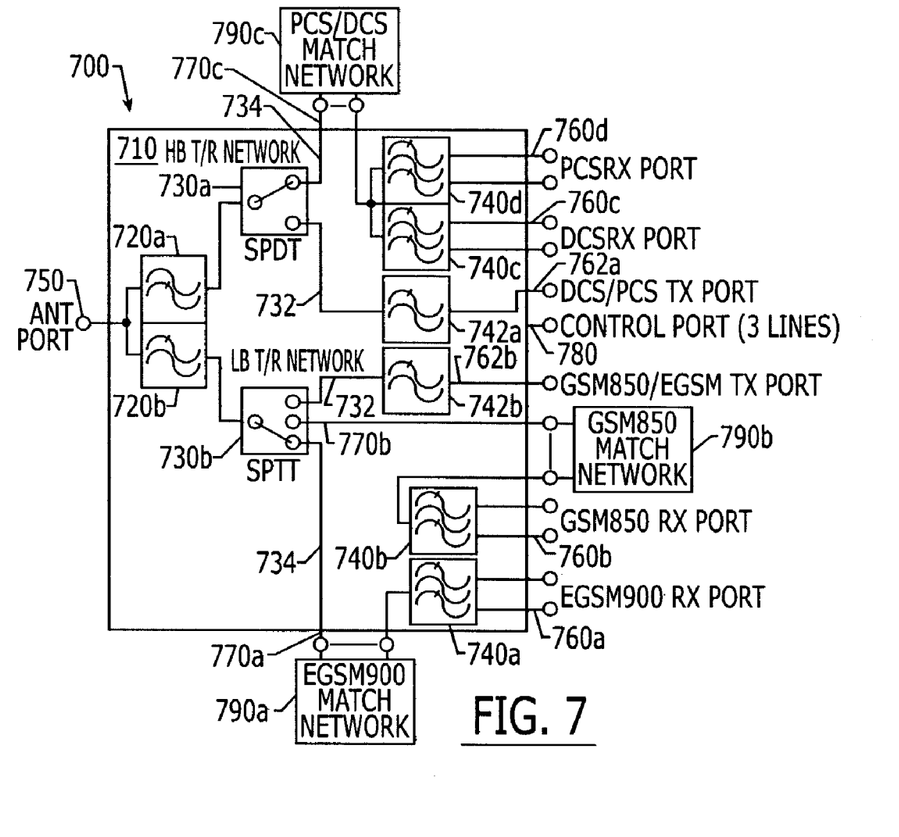

FIGS. 6 and 7 are block diagrams of antenna interface modules according to other embodiments of the invention that may be used with the four bands that were described in Table 1 above. In FIGS. 6 and 7, the high bands (DCS1800 and PCS1900) are designated by HB and the low bands (GSM850 and EGSM900) are designated by LB. In FIGS. 6 and 7, 600 series and 700 series reference numbers, respectively, correspond to the 500 series references in FIG. 5, except that in FIG. 5, a combined GSM850/EGSM900 receive port 660a is provided. A control port 680, 780 is also shown to control the switching core 630a, 630b and 730a, 730b, respectively. Matching networks for EGSM, GSM and PCS/DCS 690a–690c and 790a–790c, respectively, are shown connected across the matching network ports 670a–670c and 770a–770c, respectively. When not needed, a shunt may be connected across one or more of the matching network ports.

A popular switching technology for GSM applications may be based on P-Intrinsic-N (PIN) diodes. These devices may have excellent linearity under port impedance mismatch conditions. Unfortunately, however, PIN diodes may use about 6 mA to about 10 mA of bias current, which may be larger than transistor-based switching. Embodiments of the invention, as described for example in FIGS. 6 and 7, need not use DC bias current in PCS_RX mode, due to the DCS/PCS filter diplexing. This can, therefore, provide better standby time performance.

True bypass switched impedance matching networks according to other embodiments of the present invention now will be described. In particular, wireless terminals may need to pass both "conducted" performance tests and "radiated" performance tests. The conducted performance test may be implemented by connecting a 50Ω test system to the wireless terminal, whereas the radiated performance test is measured via the wireless terminal antenna. If the wireless terminal antenna VSWR is high because the impedance is not 50Ω, the antenna may benefit from a matching network as was described above. Unfortunately, matching the wireless terminal impedance to the antenna impedance may degrade the conducted performance. Accordingly, it may be desirable to place a switched impedance matching network between an antenna and an antenna interface module.

Figure 8:
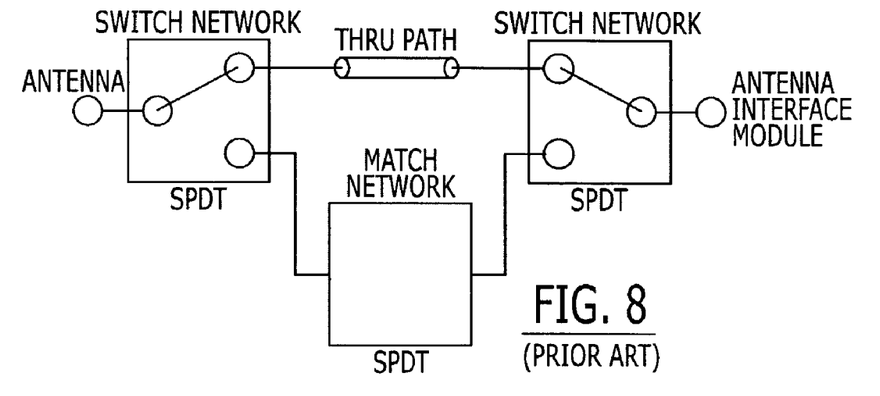
FIG. 8 is a block diagram a conventional switched impedance matching network.

A conventional switched matching network is illustrated in FIG. 8. As shown in FIG. 8, this switched matching network may be provided between an antenna and an antenna interface module, and can provide a thru-path and a matched network that are controllably switched using switch networks. Unfortunately, switched matching networks of FIG. 8 may be costly and may provide a higher loss than may be desired.

Figure 9:
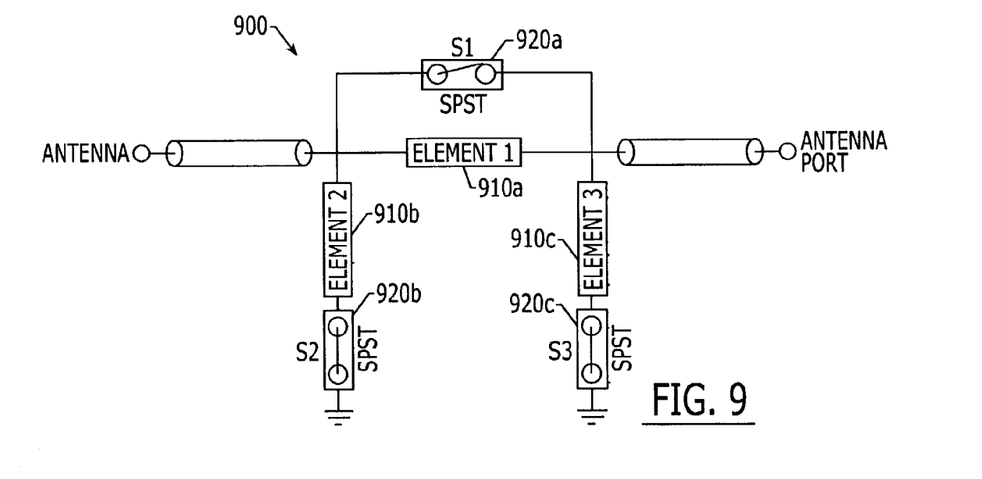
FIG. 9 is a block diagram of switched impedance matching networks according to embodiments of the present invention.

FIG. 9 is a block diagram of switched impedance matching networks according to some embodiments of the present invention, that can provide a true 20 bypass. As shown in FIG. 9, in some embodiments, these switched matching networks 900 may be placed between an antenna and an antenna port 450, 550, 650 or 750 of respective FIGS. 4–7, respectively, on a substrate that is separate from the substrate 410, 510, 610 or 710 of these respective figures. In other embodiments, switched matching networks 900 of FIG. 9 may be placed on the substrate 410, 510, 610 or 710 of respective FIGS. 4–7 between the respective antenna port 450, 550, 650 or 750 and the respective diplexer 420, 520, 620 or 720 of these figures.

As shown in FIG. 9, the switched matching network 900 includes a PI matching network that can be connected between the antenna and the antenna port.

The PI matching network includes second and third impedance elements 910b, 910c and a first impedance element 910a therebetween. A bypass switch network is configured to couple the second and third impedance elements 910b and 910c to a fixed potential such as ground in a matching mode, and to shunt across the first impedance element 910a and to uncouple the second and third impedance elements 910b and 910c from the fixed potential such as ground, in a bypass mode. In some embodiments, the bypass switched network comprises a switch 920b that is connected between the second impedance element 910b and the fixed potential such as ground, a third switch 920c that is connected between the third impedance element 910c and the fixed potential such as ground, and a first switch 920a that is connected across the first impedance element 910a.

Additional discussions of embodiments of FIG. 9 now will be provided. The first switch 920a is the thru-path switch in bypass mode. Impedance elements 910a–910c form a PI impedance matching network. Bypass mode is enabled when the first switch 920a is closed and switches 920b and 920c are open. The first switch shorts out the first impedance element 910a, and impedance elements 910b and 910c are floating above ground. In this mode, the PI network impedance elements 910a–910c are not functional. Matching mode is enabled when the first switch 920a is open and second and third switches 920b and 920c are closed. In this mode, the circuit functions as a PI impedance transformation network.

The true bypass switched matching network insertion loss according to some embodiments of the invention can be lower than conventional switches of FIG. 8 because only one switch 920a may need to be in the RF signal path. Moreover, less space may be used to integrate embodiments of FIG. 9 into a functional module, because only the first switch 920a may need to be a true RF switch. Switches 920b and 920c are outside the signal path and may need only provide a good RF ground.

Figure 10:
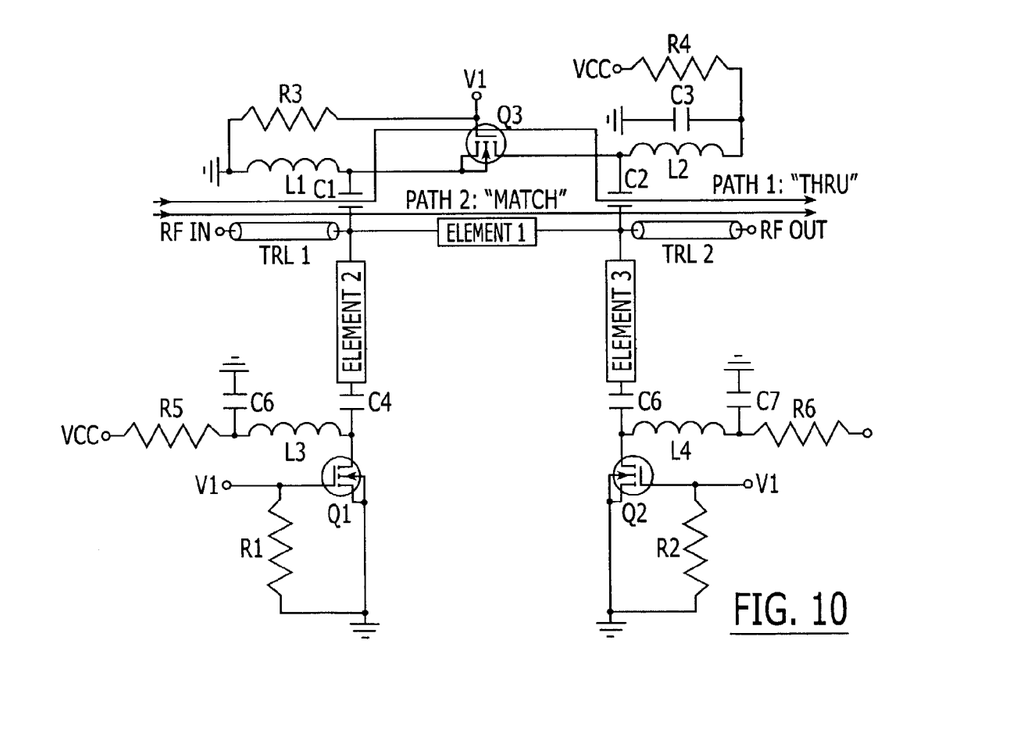
FIG. 10 is a circuit diagram of switched impedance matching networks according to embodiments of the present invention.

FIG. 10 is a circuit diagram of embodiments of switched matching networks of FIG. 9. Transistors Q1, Q2 and Q3 function as the first through third switches 920a–920c. The off state (high drain-to-source resistance—$R_{ds}$) occurs when 0 Vdc gate-to-source voltage ($V_{gs}$) exists. The on state (low $R_{ds}$) occurs during application of a positive $V_{gs}$. In some embodiments, the transistors Q1, Q2 and Q3 may be enhancement mode N channel devices. In FIG. 10, Path 1 indicates the true bypass mode RF signal flow. Path 2 indicates the matching mode RF signal flow. A truth table for the circuit of FIG. 10 is provided as Table 2. $V_{gs}$ for transistors Q1, Q2 and Q3 are shown as a function of mode.

TABLE 2

| Mode (State) | Q1 Vgs State | Q2 Vgs State | Q3 Vgs State |
|---|---|---|---|
| True Bypass Mode | Voltage not applied | Voltage not applied | +Voltage Applied |
| Matching Mode | +Voltage Applied | +Voltage Applied | Voltage not applied |

It will be understood that true bypass switched matching circuits according to embodiments of the present invention may be used as a matching network in other applications to couple an RF input to an RF output. These embodiments can provide bypass and matching modes between the RF input and the RF output as was described above.

Switching cores which employ dual shunt diodes according to some embodiments of the present invention now will be described. As was described above, it may be desirable to provide TX-to-RX isolation because wireless terminals may exhibit transmitter modulation distortion and/or peak phase error when the TX-to-RX port isolation is inadequate due to the frequency band overlaps that were described in FIG. 1. For the PCS TX to DCS RX isolation case shown by-arrow 130 of FIG. 1, a shunt element may be utilized to generate the desired isolation performance by shunting a signal to ground. For a 50Ω system, Equation 2 defines the isolation as a function of resistance to ground:

$$\text{Loss} = 10 * \log\left(\frac{2}{2 + \frac{50}{R_{\text{PIN\_Diode}}}}\right)^2 \quad (2)$$

Results of Equation 2 are provided in Table 3.

TABLE 3

| Isolation Goal (dB) | Shunt Resistance to Ground (Ohms) |
|---|---|
| 20 | 2.70 |
| 25 | 1.50 |
| 30 | 0.80 |
| 35 | 0.45 |

Accordingly, 35 dB of isolation may need low values of shunt resistance. Unfortunately, conventional PIN diodes may provide the resistance versus DC bias current performance that is shown in Table 4.

TABLE 4

| DC Bias Current (mA) | PIN Diode Resistance (Ohms) |
|---|---|
| 1 | 1.5 |
| 3 | 0.95 |
| 5 | 0.8 |
| 7 | 0.7 |
| 9 | 0.65 |

Based on the above data, it does not appear that conventional PIN diodes can achieve the desired 35 dB of isolation performance and/or may consume an excessive amount of current to do so.

Dual diode shunt networks according to embodiments of the present invention can solve these problems. These shunt networks may be used in the switching cores 430, 530, 630 or 730 of respective FIGS. 4–7. These dual PIN diode shunt networks also may be used in other applications for selectively connecting an RF input to an RF output, where conventional PIN diode switches are used and where improved isolation performance may be desired.

Figure 11:
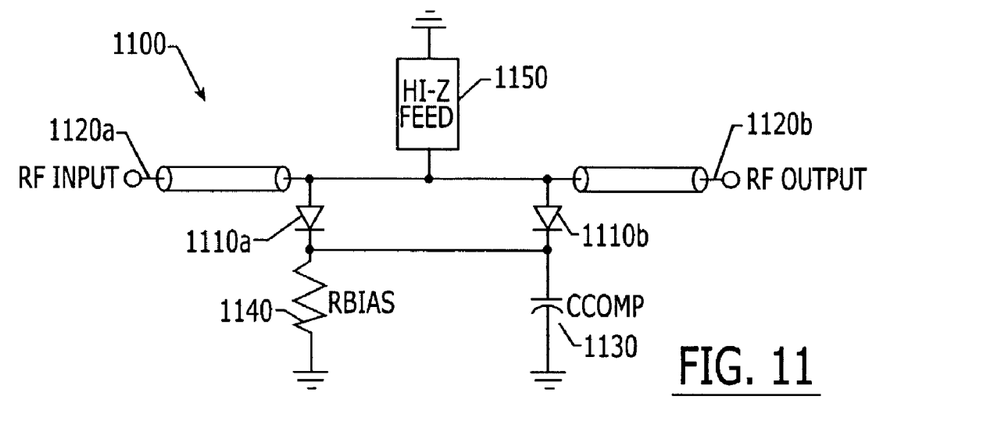
FIG. 11 is a circuit diagram of dual diode shunt networks according to embodiments of the present invention.

FIG. 11 is a block diagram of a dual diode switch according to some embodiments of the present invention. As shown in FIG. 11, a dual diode switch 1100 includes a pair of diodes such as PIN diodes 1110a and 1110b that are electrically connected in parallel to a signal path between an RF input 1120a and an RF output 1120b. This can reduce the resistance in half, compared to a single diode. A compensating capacitor 1130 is connected between the pair of diodes 1110a and 1110b and a fixed potential such as ground. A bias resistor 1140 also may be connected across the compensating capacitor 1130. A high impedance (Hi-Z) feed 1150 also may be provided to switch the diodes 1110a and 1110b on and off.

As was noted above, in some embodiments of the present invention, embodiments of FIG. 11 may be used in switching cores of FIGS. 4–7. Since the PCS TX and DCS RX bands overlap in the 1850 MHz to 1880 MHz frequency range (shown as arrow 130 of FIG. 1), the network may be tuned to resonance at 1865 MHz. In some embodiments of the present invention, the $R_{bias}$ component value is bounded by a specific calculation and the $C_{comp}$ component value is derived from the equivalent inductance of the paralleled PIN diode pair 1110a, 1110b. The on state impedance of one of the PIN diodes 1110a, 1110b is defined in Equation 3:

$$Z(N)_{\text{PIN\_Diode}} = \frac{\text{Re}\left[\frac{1}{R_{\text{PIN\_Diode}} + j2*PI*F*L_{\text{PIN\_Diode}}}\right]*N - j\text{Im}\left[\frac{1}{R_{\text{PIN\_Diode}} + j2*PI*F*L_{\text{PIN\_Diode}}}\right]*N}{\left[\left(\text{Re}\left[\frac{1}{R_{\text{PIN\_Diode}} + j2*PI*F*L_{\text{PIN\_Diode}}}\right]*N\right)^2 + \left(\text{Im}\left[\frac{1}{R_{\text{PIN\_Diode}} + j2*PI*F*L_{\text{PIN\_Diode}}}\right]*N\right)^2\right]} \quad (3)$$

where:
N = Number of paralleled Pin Diodes;
$R_{PIN\_Diode}$ = PIN Diode Resistance (Ohm) when forward biased at the desired DC current;
$L_{PIN\_Diode}$ = PIN Diode inductance (Henry) when forward biased at the desired DC current; and
F = Desired Tuning Frequency (Hertz).

Paralleling the PIN diodes 1110a and 1110b will decrease the resistance and, therefore, can increase the isolation performance. However, $R_{bias}$ and $C_{comp}$ maybe designed to provide the lowest possible shunt resistance. Equation 4 shows the compensation capacitance calculation:

$$C_{Comp} = \frac{1}{2*PI*1865E6*\text{IM}(Z[N]_{\text{PIN\_Diode}})}. \quad (4)$$

Equation 5 provides the bias resistance calculation:

$$R_{Bias} = \frac{|\text{IM}(Z[N]_{\text{PIN\_Diode}})|^2}{0.20*\text{Re}(Z[N]_{\text{PIN\_Diode}})}. \quad (5)$$

The $C_{comp}$ value can be used to set the resonant frequency and the $R_{bias}$ value can be used to set the final shunt resistance to limit the maximum DC bias current. A cost effective 35 dB isolation design may be achieved by implementing the topology defined in FIG. 11 and utilizing Equations 2–5. It also will be understood that embodiments of FIG. 11 may be used to provide switching between an RF input and an RF output in applications other than a switching core of a quad band antenna interface module. Finally, it will be understood that any of the embodiments of the invention that are described herein may be combined with a plurality of wireless terminal components to provide a wireless terminal.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A quad band antenna interface module comprising:
   a diplexer that is configured to connect to an antenna port;
   a switching core that is connected to the diplexer;
   a plurality of filters that are connected to the switching core and are configured to provide transmit and receive ports for four frequency bands; and at least one matching network port connected between the switching core and at least one of the plurality of filters and configured to connect a matching network thereto;

wherein the diplexer, the switching core and the plurality of filters are located on a single substrate and wherein the antenna port, the transmit and receive ports for four frequency bands and the at least one matching network port are configured to provide external input/output connections to the substrate.

2. A quad band antenna interface module according to claim 1 wherein the plurality of filters comprises three filters and wherein the at least one matching network port comprises three matching network ports, a respective one of which is connected between the switching core and a respective one of the three filters and configured to connect a matching network thereto.

3. A quad band antenna interface module according to claim 2 wherein the plurality of filters comprise a plurality of transmit filters and three receive filters and wherein the at least one matching network port is connected between the switching core and a respective one of the three receive filters.

4. A quad band antenna interface module according to claim 2 wherein the three matching network ports each includes a matching network or a shunt-connected thereacross.

5. A quad band antenna interface module according to claim 1 wherein the plurality of filters comprises a plurality of transmit filters and a plurality of receive filters and wherein the at least one matching network port is connected between the switching core and at least one of the plurality of receive filters.

6. A quad band antenna interface module according to claim 1:

wherein the quad bands comprise a first frequency band, a second frequency band that partially overlaps the first frequency band, a third frequency band and a fourth frequency band that partially overlaps the third frequency band, the first and second frequency bands being nonoverlapping with the third and fourth frequency bands;

wherein the diplexer comprises a first diplexer filter fur the third and fourth frequency bands and a second diplexer filter for the first and second frequency bands;

wherein the switching core comprises a first transmit/receive switch connected to the first diplexer filter and a second transmit/receive switch connected to the second diplexer filter;

wherein the plurality of filters comprises first through fourth receive filters for the respective first through fourth frequency bands, the first and second receive filters being connected to the second transmit/receive switch and the third and fourth receive filters being connected to the first transmit/receive switch; and wherein the at least one matching network port comprises a matching network port connected between the second transmit/receive switch and the first receive filter.

7. A quad band antenna interface module according to claim 1:

wherein the quad bands comprise a first frequency band, a second frequency band that partially overlaps the first frequency band, a third frequency band and a fourth frequency band that partially overlaps the third frequency band, the first and second frequency bands being nonoverlapping with the third and fourth frequency bands;

wherein the diplexer comprises a first diplexer filter for the third and fourth frequency bands and a second diplexer filter for the first and second frequency bands;

wherein the switching core comprises a first transmit/receive switch connected to the first diplexer filter and a second transmit/receive switch connected to the second diplexer filter;

wherein the plurality of filters comprises first through fourth receive filters for the respective first through fourth frequency bands, the first and second receive filters being connected to the second transmit/receive switch and the third and fourth receive filters being connected to the first transmit/receive switch; and wherein the at least one matching network port comprises a matching network port connected between the second transmit/receive switch and the second receive filter.

8. A quad band antenna interface module according to claim 1;

wherein the quad bands comprise a first frequency band, a second frequency band that partially overlaps the first frequency band, a third frequency band and a fourth frequency band that partially overlaps the third frequency band, the first and second frequency bands being nonoverlapping with the third and fourth frequency bands;

wherein the diplexer comprises a first diplexer filter for the third and fourth frequency bands and a second diplexer filter for the first and second frequency bands;

wherein the switching core comprises a first transmit/receive switch connected to the first diplexer filter and a second transmit/receive switch connected to the second diplexer filter;

wherein the plurality of filters comprises first through fourth receive filters for the respective first through fourth frequency bands, the first and second receive filters being connected to the second transmit/receive switch and the third and fourth receive filters being connected to the first transmit/receive switch; and wherein the at least one matching network port comprises a matching network port connected between the first transmit/receive switch and the third and fourth receive filters.

9. A quad band antenna interface module according to claim 8 wherein the matching network port comprises a first matching network port, the quad band antenna interface module further comprising:

a second matching network port connected between the second transmit/receive switch and the first receive filter; and a third matching network port connected between the second transmit/receive switch and the second receive filter.

10. A quad band antenna interface module according to claim 8 wherein the first frequency band is the GSM850 frequency band, the second frequency band is the EGSM900 frequency band, the third frequency band is the DCS1800 frequency band and the fourth frequency band is the PCS1900 frequency band.

11. A quad band antenna interface module according to claim 1:

wherein the quad bands comprise a first frequency band, a second frequency band that partially overlaps the first frequency band, a third frequency band and a fourth frequency band that partially overlaps the third frequency band, the first and second frequency bands being nonoverlapping with the third and fourth frequency bands;

wherein the diplexer comprises a first diplexer filter for the third and fourth frequency bands and a second diplexer filter for the first and second frequency bands;

wherein the switching core comprises a first transmit/receive switch connected to the first diplexer filter and a second transmit/receive switch connected to the second diplexer filter;

wherein the plurality of filters comprises first through fourth receive filters for the respective first through fourth frequency bands, the first and second receive filters being connected to the second transmit/receive switch and the third and fourth receive filters being connected to the first transmit/receive switch; and wherein the at least one matching network port comprises a matching network port connected between the first transmit/receive switch and the third receive filter.

12. A quad band antenna interface module according to claim 1:

wherein the quad bands comprise a first frequency band, a second frequency band that partially overlaps the first frequency band, a third frequency band and a fourth frequency band that partially overlaps the third frequency band, the first and second frequency bands being nonoverlapping with the third and fourth frequency bands;

wherein the diplexer comprises a first diplexer filter for the third and fourth frequency bands and a second diplexer filter for the first and second frequency bands;

wherein the switching core comprises a first transmit/receive switch connected to the first diplexer filter and a second transmit/receive switch connected to the second diplexer filter;

wherein the plurality of filters comprises first through fourth receive filters for the respective first through fourth frequency bands, the first and second receive filters being connected to the second transmit/receive switch and the third and fourth receive filters being connected to the first transmit/receive switch; and wherein the at least one matching network pan comprises a matching network port connected between the first transmit/receive switch and the fourth receive filter.

13. A quad band antenna interface module according to claim 1 further comprising:

at least one matching network, a respective one of which is connected to a respective one of the at least one matching network ports.

14. A quad band antenna interface module according to claim 1 wherein the plurality of filters comprises a plurality of transmit filters and a plurality of receive filters and wherein the at least one matching network port is not connected between the switching core and the plurality of transmit filters.

15. A quad band antenna interface module according to claim 1 wherein the switching corn comprises a plurality of diode switches, at least one of the diode switches comprising:

a pair of diodes electrically connected in parallel to a signal path; and a compensating capacitor connected between the pair of diodes and a fixed potential.

16. A quad band antenna interface module according to claim 15 further comprising a bias resistor connected across the compensating capacitor.

17. A quad band antenna interface module according to claim 1 in combination with a plurality of quad band wireless terminal components to provide a quad band wireless terminal.

18. A quad band antenna interface module comprising:

a diplexer that is configured to connect to an antenna port;

a switching core that is connected to the diplexer;

a plurality of filters that are connected to the switching core and are configured to provide transmit and receive ports for four frequency bands;

at least one matching network port connected between the switching core and at least one of the plurality of filters and configured to connect a matching network thereto;

a PI matching network connected to the antenna port, the PI matching network including second and third impedance elements and a first impedance element therebetween; and a bypass switch network that is configured to couple the second and third impedance elements to a fixed potential in a matching mode and to shunt across the first impedance element and uncouple the second and third leg impedance elements from the fixed potential in a bypass mode.

19. A quad band antenna interface module according to claim 18 wherein the bypass switch network comprises a second switch that is connected between the second impedance element and the fixed potential, a third switch that is connected between the third impedance element and the fixed potential and a first switch that is connected across the first impedance element.

20. An antenna interface module comprising:

a transmit/receive switching core that is connected to an antenna port to provide separate transmit and receive paths;

a least one receive filter that is connected to the receive path of the switching core and is configured to provide at least one receive port for at least one frequency band;

at least one matching network port that is connected to the receive path of the switching core and is configured to connect a matching network thereto; and at least one transmit filter that is connected to the transmit path of the switching core and is configured to provide at least one transmit port for the at least one frequency band, the transmit path being free of a matching network port;

wherein the transmit/receive switching core, the at last one receive filter and the at least one transmit filter are located on a single substrate and wherein the antenna port, the at least one transmit port, the at last one receive port and the at least one matching network port are configured to provide external input/output connections to the substrate.

21. An antenna interface module according to claim 20 wherein the at least one receive filter comprises three receive filters and wherein the at least one matching network port comprises three matching network ports, a respective one of which is connected between the switching core and a respective one of the three receive filters and configured to connect a matching network thereto.

22. An antenna interface module according to claim 20:

wherein the at last one frequency band comprises a first frequency band, a second frequency band that partially overlaps the first frequency band, a third frequency band and a fourth frequency band that partially overlaps the third frequency band, the first and second frequency bands being nonoverlapping wit the third and fourth frequency bands;

wherein the at least one receive filter comprises first through fourth receive filters for the respective first through fourth frequency bands; and wherein the at least one matching network port comprises a marching network port connected to the third and fourth receive filters.

23. An antenna interface module according to claim 22 wherein the matching network port comprises a first matching network port, the quad band antenna interface module further comprising:
a second matching network port connected between the second transmit/receive switch and the first receive filter; and
a third matching network port connected between the second transmit/receive switch and the second receive filter.

24. An antenna interface module according to claim 20 in combination with a plurality of wireless terminal components to provide a wireless terminal.

25. A network for coupling a Radio Frequency (RF) input to an RF output comprising:
a PI matching network connected between the RF input and the RF output, the PI matching network including second and third impedance elements and a first impedance element therebetween; and
a bypass switch network that is configured to couple the second and third impedance elements to a fixed potential in a matching mode and to short out the first impedance element and uncouple the second and third impedance elements from the fixed potential in a bypass mode.

26. A network for coupling a Radio Frequency (RF) input to an RF output comprising:
a PI matching network connected between the RF input and the RF output, the PI matching network including second and third impedance elements and a first impedance element therebetween; and
a bypass switch network that is configured to couple the second and third impedance elements to a fixed potential in a matching mode and to shunt across the first impedance element and uncouple the second and third impedance elements from the fixed potential in a bypass mode;
wherein the bypass switch network comprises a second switch that is connected between the second impedance element and the fixed potential, a third switch that is connected between the third impedance element and the fixed potential and a first switch that is connected across the first impedance element.

27. A network for coupling a Radio Frequency (RF) input to an RF output comprising:
a PI matching network connected between the RF input and the RF output, the PI matching network including second and third impedance elements and a first impedance element therebetween; and
a bypass switch network that is configured to couple the second and third impedance elements to a fixed potential in a matching mode and to shunt across the first impedance element and uncouple the second and third leg impedance elements from the fixed potential in a bypass mode;
wherein the RF input is connected to an antenna, wherein the matching mode is initiated in response to a radiated performance test and wherein the bypass mode is initiated in response to a conducted performance test.

28. A Radio Frequency (RF) switch for selectively connecting an RF input to an RF output, comprising:
a pair of diodes electrically directly connected to one another in parallel to define first and second nodes, wherein the first node is connected between the RF input and the RF output; and
a compensating capacitor connected between the second node and a fixed potential.

29. An RF switch according to claim 28 further comprising a bias resistor connected across the compensating capacitor.

* * * * *

UNITED STATES PATENT AND TRADEMARK OFFICE
CERTIFICATE OF CORRECTION

| | | |
|---|---|---|
| PATENT NO. | : 7,049,906 B2 | Page 1 of 1 |
| APPLICATION NO. | : 10/447777 | |
| DATED | : May 23, 2006 | |
| INVENTOR(S) | : Bruce Emerson Wilcox | |

It is certified that error appears in the above-identified patent and that said Letters Patent is hereby corrected as shown below:

Column 13, line 39, "pan" should be --port--.

Signed and Sealed this

Seventeenth Day of October, 2006

JON W. DUDAS
*Director of the United States Patent and Trademark Office*